United States Patent Office

3,434,817
Patented Mar. 25, 1969

3,434,817
INCREASING THE STRENGTH OF GLASS BY OVERGLAZING
James J. Hazdra, Joliet, Ill., David Sonnleitner, Menasha, Wis., and Wayne E. Wesolowski, Lombard, Ill., assignors to Continental Can Company, Inc., New York, N.Y., a corporation of New York
No Drawing. Filed Sept. 3, 1965, Ser. No. 485,114
Int. Cl. C03c 17/06, 17/20
U.S. Cl. 65—60                    4 Claims

ABSTRACT OF THE DISCLOSURE

A method for increasing the strength of glass wherein a glazing composition is applied to a glass object, the glazing composition having a lower coefficient of expansion than the glass, and composed of the oxides of lead, zinc and boron. The glazing composition is applied to the glass at a temperature lower than the deformation temperature of the glass, thereby avoiding any possibility of deformation of the glass.

---

This invention relates to a method for increasing the strength of glass and more specifically to a method for increasing the strength of glass or glass objects by the application of a glazing material to the glass having a lower coefficient of expansion than the glass.

It is known that if the surface of a glass object is slightly damaged, even by placing a glass object on a table or by permitting a glass-to-glass contact, the tensile strength of the glass which was originally 9,000 to 12,000 p.s.i. (pounds per square inch) is drastically reduced to 2,000 to 5,000 p.s.i. Since most glass objects receive some "damage" even in careful handling, the glass object is now more easily fractured due to the shock to which the glass object has been subjected. This "damage" referred to, is not optically visible but is, as set forth, a reduction in the tensile strength of the glass comprising the object.

The application of glazing mixtures to glass or ceramic objects to increase the strength of the glass or ceramic object is known. Further, it is known to apply a glazing mixture which has a coefficient of expansion lower than that of the object to be glazed. It has been found that objects under tension, compression, or neutral forces may be converted to a substantially high condition of compression when the object is coated with a thin layer of glass which has a lower coefficient of expansion than the glass to be coated. Experiments have shown that a glass surface covered with a glazed layer under compression is considerably stronger than a glass object having a surface under tension. However, the glazes and glazing material of the prior art had flow points above the deformation of most glasses so that some deformation of the glass resulted when coated or sprayed with the glazing material.

Unlike the glazes of known composition, the present invention relates to a glass or glaze that has been formulated which has a lower coefficient of linear expansion than most glasses, such as soda-lime glass, crown glass, and other glasses having a coefficient of expansion above approximately $85 \times 10^{-7}$ in./in./degree, and which has a flow point below 620° C., which is a temperature below the deformation of most soda-lime glasses.

Thus, in the present invention, the glaze or glaze material may be applied to the glass object at a temperature below the deformation temperature of the object so that the final dimensions of the glass object can be accurately predicted.

In addition to the foregoing novel features, the method described in the present invention can be economically and rapidly employed in a production line for the manufacture of glass articles with very little increase in the cost of the article. As a result, a strengthened glass product is produced having little tendency to fracture and having no impairment of the optical qualities of the glass.

Accordingly, it is the principal object of the present invention to improve the quality of glass and glass objects.

It is a further object of the present invention to increase the strength of glass and glass objects so that they are less subject to breakage and fracture.

It is a further object of the present invention to provide a method for glazing a glass object which imparts to the object increased resistance to fracture and breakage.

It is a further object of the present invention to provide a method for glazing a glass object which imparts to the object increased resistance to fracture and breakage, the glazing being applied at a temperature below the deformation temperature of the object.

It is a further object of the present invention to provide a method for producing a glaze suitable for increasing the strength of glass objects, which has a lower coefficient of expansion than the object to which the glaze is subsequently applied.

It is a further object of the present invention to provide an article in the form of a glazed glass object whose surface is in compression and less subject to fracture and breakage.

It is a still further object of the present invention to provide a composition for glazing glass objects which has a lower coefficient of expansion than the object and which can be applied at a temperature below the deformation temperature of the object.

These and other objects of the present invention are accomplished by preparing a glaze composition of lead oxide, zinc oxide, and boron oxide. The foregoing are mixed togther, melted, cooled and powdered. A suspension of the powder is prepared in water along with a suitable suspension agent and a wetting agent. Thereafter, the glass to be sprayed or coated is heated to approximately 620° C. and the glaze which has been prepared is applied to the surface of the glass. Thereafter, the glass is annealed at succesively lower temperatures before cooling slowly to room temperature.

The glass or glass objects thus subjected to the glaze are much stronger and less likely to crack or fracture since the glaze, having a lower coefficient of expansion of the glass or glass object, is in compresion which lends strength and rigidity to the object.

Another salient feature of the invention is that the glaze can be applied to the glass object at a temperature below the deformation temperature of the glass object. In this manner, the final shape and configuration of the glass object can be predicted since the glass object to be overglazed would not deform during the process.

The following examples are set forth to illustrate more clearly the principles and practice of the invention to those skilled in the art. Any percentages set forth are by weight of the total mixture.

Example I 72 pounds of PbO, 8 pounds of ZnO and 20 pounds of $B_2O_3$ are mixed together and heat is applied so that a temperature is reached to sufficiently melt the ingredients and form a homogeneous mass. The mass is thereafter cooled and ground to a powder, the powder passing a 325 mesh screen.

Next, a 10% suspension of the powder is prepared in water along with a 0.1% suspension agent and a 0.1% wetting agent. A suitable suspension agent is carboxymethyl cellulose and a suitable wetting agent is sorbitan monoleate 20 ethylene oxide groups.

Next, several glass discs 69 mm. in diameter and 0.090 inch thick of soda-lime glass are heated to 620° C. Certain of the glass discs are then sprayed with the suspension produced. Others are not sprayed and are retained for control purposes. The temperature of all of the glass discs is then reduced to 600° C. and maintained for 20 minutes.

Next, the glass discs are annealed at the following temperatures for the time period indicated: The temperature is reduced from 600° C. to 538° C. for 10 minutes; the temperature is then reduced to 510° C. and maintained for 10 minutes; the temperature is then reduced to 482° C. and maintained for 10 minutes; the temperature is then reduced to 454° C. and maintained for 5 minutes; and, the furnace is then turned off and allowed to cool to room temperature.

The glass surface is clear with no visible color. X-ray emission analysis has shown the presence of zinc and lead in the glass surface. Untreated glass discs substantially identical to the glazed glass discs were subjected to a crushing force and the magnitude of the force was recorded. Subsequently, the glazed glass discs as prepared according to the conditions set forth were subjected to the crushing force and it was found that more than two times the force was required to fracture the glazed or treated glass discs than required to fracture the untreated control discs. More specifically, the magnitude of the force required to fracture the untreated glass control discs of the examples was in the range of 9,000 to 12,000 p.s.i. while the force required to fracture the treated discs of all the examples was in the range of 24,000 to 27,000 p.s.i. The method for the determination of the tensile strength of the glass discs set forth is described in a report issued May 1, 1964 and entitled "Method of Increasing Strength of Glass," by Dr. J. J. Hazdra, St. Procopius, College and J. M. Herbach, Hazel Atlas Glass Division, Continental Can Company, Inc.

The composition of the soda-lime glass discs employed was 72.86 wt. percent $SiO_2$, 0.50 wt. percent $Al_2O_3$, 0.16 wt. percent $Fe_2O_3$, 8.51 wt. percent CaO, 3.99 wt. percent MgO, 0.40 wt. percent $SO_3$, 0.12 wt. percent $As_2O_3$, 0.12 wt. percent $K_2O$, and 13.52 wt. percent $Na_2O$.

The linear coefficient of expansion of this glass was experimentally determined to be $92 \times 10^{-7}$ in./in./deg. The coefficient of expansion of the glaze was determined to be in the range of 85 to $87 \times 10^{-7}$ in./in./deg. It will be noted that the glaze was applied to the glass disc at a temperature below the deformation temperature of the glass discs, namely, at about 620° C.

*Example II*

In this example, the lead oxide and the zinc oxide are decreased and increased, respectively, so as to establish a range for these compounds. More specifically, the conditions are substantially identical to the Example I except that 71 pounds of PbO, 9 pounds of ZnO and 20 pounds of $B_2O_3$ are mixed together, melted, cooled and then ground to a powder which passes a 325 mesh screen. The remaining steps of the method are substantially identical to those set forth in Example I. However, the suspension agent and wetting agent may be varied over a considerable range such as from 0.05% to 1% or more with the preferred quantities of each of the agents being about 0.1% by weight. Upon subjection of the glass discs to the fracturing apparatus, the coated glass discs were found to require more than twice the force required for fracture than the uncoated discs.

The lower range for PbO appears to be about 71 pounds while the upper range for ZnO appears to be about 9 pounds.

*Example III*

In this example, the PbO is varied so as to establish an upper range of the compound in the composition. More specifically, 73 pounds of PbO are mixed with 8 pounds of ZnO and 19 pounds of $B_2O_3$. The composition is mixed, melted, cooled and powdered and a suspension according to the procedure set forth in the Example I is prepared. The objects to be sprayed are heated, the glaze is applied, and the glass discs are annealed. Again, when the discs are subjected to fracture, it was found that more than twice the force was required to fracture the coated discs than the uncoated discs.

*Example IV*

In this example, the ingredients of the composition are varied so as to establish a lower range for the ZnO. Accordingly, 7 pounds of ZnO are mixed with 72 pounds of PbO and 21 pounds of $B_2O_3$. The composition is prepared, powdered, and the glass discs sprayed with the glaze substantially as set forth by the procedure of the Example I. Again, it was found that the glaze composition yielded a compressional stress and melted below 620° C. so that the glass discs were not subjected to deformation during the glazing process. When the discs were subjected to fracture, it was found that the force required to fracture the coated discs was again more than twice that necessary to fracture the uncoated discs. Thus, a lower range of about 7% is established for the ZnO.

*Example V*

The purpose of this example is to establish an upper range for the $B_2O_3$. The lower ranges of PbO and ZnO are used. More specifically, 22 pounds of $B_2O_3$ are mixed with 71 pounds of PbO and 7 pounds of ZnO. The composition is melted, cooled, powered and a suspension is prepared substantially by the produce set forth in the Example I. The glass discs are prepared as previously set forth in the examples and the glaze is applied. Subsequent testing again discloses that more than twice the force is required to fracture the coated discs than the uncoated discs. Thus, an upper range of about 22% has been established for the $B_2O_3$ while lower ranges of approximately 71% for the PbO and 7% for the ZnO have been previously established.

*Example VI*

In this example, the upper range of PbO is established along with a lower range for the $B_2O_3$. The ZnO is employed in an amount equal to its upper limit which was established in Example II. More specifically, 73 pounds of PbO, 9 pounds of ZnO and 18 pounds of $B_2O_3$ are prepared according to the procedures previously set forth in the examples and after glazing and annealing of the glass discs, the force required to fracture the coated discs was again found to be more than twice that necessary for fracturing the uncoated discs.

According to this example, an upper range has been established for the PbO and a lower range for the $B_2O_3$. To summarize, the lead oxide may be employed in the practice of the invention in a range by weight of 71% to 73%, the ZnO may be utilized in a range of from 7% to 9%, and the $B_2O_3$ may be employed in a range of 18% to 22%. In addition, the range of the suspension agent and the wetting agent were not found to be critical and that the preferred amount, by weight, was found to be approximately 0.1%.

*Example VII*

The next three examples are employed to establish a range for the suspension of the powder in water. Accordingly, the preferred composition for the powdered material will be employed which is 72 pounds of PbO, 8 pounds of ZnO and 20 pounds of $B_2O_3$. The powder is prepared by the procedure set forth in the Example I and a 5% suspension of the powder is prepared in water along with suitable suspension and wetting agents. The glass discs to be sprayed are heated to the required temperature of approximately 620° C., the glaze applied and the coated glass discs are annealed. In this example, as in all previous examples, a plurality of glass discs are subjected to the same temperatures as the glass disc which are coated.

However, certain of the glass discs are not coated so that they can be used as reference discs in determining the ratio of the forces required to fracture the coated discs and the uncoated discs.

With a 5% suspension of the powder in water as produced by this experiment, the coated glass discs were found to require approximately twice the force for fracture as the uncoated glass discs.

*Example VIII*

In this example, the powder of the preferred embodiment is employed to prepare a 1% suspension of the powder in water along with the suspension and wetting agents. The procedure for glazing and annealing the glass discs is substantially as that set forth in the previous examples and the coated discs prepared from the 1% suspension still require approximately twice the force for fracture as the force necessary to fracture the uncoated discs. During the glazing process, it was believed that sufficient amounts of the composition were deposited upon the glass discs since the water would be immediately expelled upon contact with the glass discs at approximately 620° C.

*Example IX*

In this experiment, an upper range is established for the suspension of the composition. Accordingly, a 25% (pound) suspension of the composition having the preferred ratio of ingredients is prepared in water along with suitable suspension and wetting agents. The glass discs are prepared in the manner set forth in the previous experiments. Upon subjection of the coated glass discs and the uncoated glass discs to fracture, it was found that the coated glass discs require approximately twice the force for fracture as the uncoated glass discs.

Thus, the last three experiments establish a range of about 1% to 25% by weight of the suspension in water. The low range was found to have equally advantageous effects upon the glass discs as well as the high range. Beyond a suspension of approximately 25%, it becomes increasingly difficult to spray or glaze the almost solid concentration.

Thus, the foregoing teaching along with the experiments sets forth salient features of the invention. That is, the preparation of a glaze having a composition of about 72% PbO, 8% ZnO and 20% $B_2O_3$, which is applied to glass or glass objects having a coefficient of expansion slightly greater than the coefficient of expansion of the glaze, will substantially increase the resistance of the glass or the glass objects to fracture. Since the glass which has been glazed has a higher coefficient of expansion than the glaze, upon cooling the glaze is placed in a condition of compression so that added strength to the glass is obtained. Furthermore, it will be observed that the glaze prepared according to the teaching of the present invention can be applied to the glass or glass objects at a temperature well below the deformation temperature of the glass or glass object so that no flow of the glass takes place during the glazing process. By this means, the final configuration and dimension of the glass or glass object can be accurately predicted. In addition, the glaze after aplication to the glass or glass object need only be fired at 600° C. to 620° C. for 20 minutes. In the prior art, the teaching has been that the glazes need be fired for over two hours.

After the glass discs have been glazed in accordance with the principles of the present invention, the glass surface was clear with no visible color. Upon examination of the surfaces by X-ray emission analysis, the presence of zinc and lead were observed in the glass surface. Thus, the invention has shown that a glass object covered with a glaze layer under compression is considerably stronger than a glass object having a surface under tension. Further, it has been found from the experiments that the fracture pressure of the glazed glass discs was more than twice that of the untreated or uncoated glass discs. Further, no deformation of the glass discs took place during the process since the process was carried out at temperatures below the deformation temperature of the glass discs.

The above description and particularly the examples are set forth by way of illustration only. Thus, the present invention may be embodied in other specific forms and ratios without departing from the spirit and the essential characteristics of the invention. The present embodiment is, therefore, to be considered in all respects as illustrative and the scope of the invention being indicated by the appended claims rather than the foregoing description, and all changes which come within the meaning and range of the equivalency of the claims are, therefore, intended to be embraced therein.

What is claimed is:

1. A method of increasing the strength of glass by placing the surface of the glass in compression which comprises forming a glaze combination consisting essentially of PbO, ZnO and $B_2O_3$, the PbO being present in the combination in the range of 71% to 73%, the ZnO being present in the combination in the range of 7% to 9%, and the $B_2O_3$ being present in the combination in the range of 18% to 22%, all by weight percent, suspending the glaze combination in a suspension medium containing suitable suspension wetting agents, heating the glass to be coated at an elevated temperature but below its deformation temperature, spraying the surface of the glass with the combination, and annealing the glass with successively lower temperatures before cooling to room temperature.

2. The method of claim 1 wherein the mixture of PbO, ZnO and $B_2O_3$ is melted to form a mass and the resultant mass cooled and then ground to form a powder, the powder then being formed in a suspension in water.

3. The method of claim 1 wherein the glaze combination is suspended in an aqueous medium containing 0.1% by weight suspension agent and 0.1% by weight wetting agent.

4. A glass article prepared by the method of claim 1.

References Cited

UNITED STATES PATENTS

| | | | |
|---|---|---|---|
| 3,228,548 | 1/1966 | Butler. | |
| 1,547,715 | 7/1925 | Baker | 65—60 XR |
| 1,960,121 | 5/1934 | Moulton | 65—60 XR |
| 2,238,777 | 4/1941 | Lemmer et al. | 65—30 XR |
| 2,305,683 | 12/1942 | Engels | 65—60 XR |
| 2,998,675 | 9/1961 | Olcott et al. | 65—30 XR |
| 3,249,466 | 5/1966 | Lusher | 65—60 XR |
| Re. 25,791 | 6/1965 | Claypoole | 65—43 XR |

S. LEON BASHORE, *Primary Examiner.*

FRANK W. MIGA, *Assistant Examiner.*

U.S. Cl. X.R.

65—33, 30; 117—124